United States Patent
Nishikawa

(10) Patent No.: US 9,269,938 B2
(45) Date of Patent: Feb. 23, 2016

(54) SEPARATOR FOR NONAQUEOUS SECONDARY BATTERY, AND NONAQUEOUS SECONDARY BATTERY

(75) Inventor: Satoshi Nishikawa, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 464 days.

(21) Appl. No.: 13/704,131

(22) PCT Filed: Oct. 21, 2011

(86) PCT No.: PCT/JP2011/074260
§ 371 (c)(1),
(2), (4) Date: Dec. 13, 2012

(87) PCT Pub. No.: WO2012/137377
PCT Pub. Date: Oct. 11, 2012

(65) Prior Publication Data
US 2013/0095365 A1    Apr. 18, 2013

(30) Foreign Application Priority Data
Apr. 8, 2011  (JP) .................. 2011-086386

(51) Int. Cl.
*H01M 2/16* (2006.01)
*H01M 2/14* (2006.01)
*H01M 8/12* (2006.01)

(52) U.S. Cl.
CPC .............. *H01M 2/162* (2013.01); *H01M 2/145* (2013.01); *H01M 2/1653* (2013.01); *H01M 2/1686* (2013.01); *H01M 2008/1293* (2013.01); *Y02E 60/12* (2013.01); *Y02E 60/525* (2013.01)

(58) Field of Classification Search
CPC ..... H01M 2/14; H01M 2/162; H01M 2/1653; H01M 2/1686; Y02E 60/12
See application file for complete search history.

(56) References Cited

U.S. PATENT DOCUMENTS

| 5,418,091 A | 5/1995 | Gozdz et al. | |
| 2002/0001753 A1* | 1/2002 | Pekala et al. | 429/249 |
| 2002/0197413 A1 | 12/2002 | Daido et al. | |
| 2004/0053122 A1* | 3/2004 | Sugiyama et al. | 429/144 |
| 2006/0088762 A1 | 4/2006 | Okamoto | |
| 2007/0178384 A1* | 8/2007 | Kajita et al. | 429/251 |
| 2010/0178544 A1 | 7/2010 | Nishikawa | |
| 2012/0070644 A1* | 3/2012 | Kang et al. | 428/220 |

FOREIGN PATENT DOCUMENTS

| CN | 1495936 A | | 5/2004 |
| JP | 8-509100 A | | 9/1996 |
| JP | 9-328566 A | | 12/1997 |
| JP | 2001-266942 A | | 9/2001 |
| JP | 2003-086162 | * | 3/2003 |
| JP | 2003-86162 A | | 3/2003 |
| JP | 2003-171495 A | | 6/2003 |
| JP | 2006-120462 A | | 5/2006 |
| JP | 2007-317675 A | | 12/2007 |
| KR | 20100111065 A | | 10/2010 |
| TW | 200913353 A | | 3/2009 |
| TW | 201105505 A | | 2/2011 |
| WO | 2010/098497 A1 | | 9/2010 |
| WO | 2011114626 A1 | | 9/2011 |

OTHER PUBLICATIONS

Communication dated Aug. 13, 2014 from the European Patent Office in counterpart European Patent Application No. 11863157.1.
Communication dated Aug. 6, 2014 from the European Patent Office in counterpart European Patent Application No. 11863157.1.
S. Abbrent et al., "Crystallinity and morphology of PVdF-HFP-based gel electrolytes", Polymer, vol. 42, 2001, pp. 1407-1416, XP002727498.
F. Liu et al., "Progress in the production and modification of PVDF membranes" Journal of Membrane Science, vol. 375, Mar. 12, 2011, pp. 1-27, XP002727429.

* cited by examiner

Primary Examiner — Laura Weiner
(74) Attorney, Agent, or Firm — Sughrue Mion, PLLC

(57) ABSTRACT

An object of the invention is to provide a separator for a nonaqueous secondary battery, which has good adhesion to electrodes and is also capable of ensuring sufficient ion permeability even after attachment to an electrode. The separator for a nonaqueous secondary battery of the invention includes a porous substrate and an adhesive porous layer formed on at least one side of the porous substrate and containing a polyvinylidene-fluoride-based resin. The separator for a nonaqueous secondary battery is characterized in that the adhesive porous layer has a crystallinity of 20 to 35%.

9 Claims, No Drawings

SEPARATOR FOR NONAQUEOUS SECONDARY BATTERY, AND NONAQUEOUS SECONDARY BATTERY

CROSS REFERENCE TO RELATED APPLICATIONS

This application is a National Stage of International Application No. PCT/JP2011/074260 filed Oct. 21, 2011, the contents of which are incorporated herein by reference in their entirety.

TECHNICAL FIELD

The present invention relates to a separator for a nonaqueous secondary battery and also to a nonaqueous secondary battery.

BACKGROUND ART

Nonaqueous secondary batteries, such as lithium ion secondary batteries, have been widely used as power supplies for portable electronic devices such as laptop computers, mobile phones, digital cameras, and camcorders. Further, these batteries are characterized by having high energy density, and thus the application to automobiles and the like has also been studied in recent years.

With the reduction in size and weight of portable electronic devices, the outer casing of a nonaqueous secondary battery has been simplified. At first, a battery can made of stainless steel was used as an outer casing, and then an outer casing made of an aluminum can was developed. Further, a soft pack outer casing made of an aluminum laminate pack has also been developed nowadays. In the case of a soft pack outer casing made of an aluminum laminate, because such an outer casing is soft, a space may be formed between an electrode and a separator during charging and discharging, causing a technical problem in that the cycle life is reduced. In terms of solving this problem, a technique for attaching an electrode and a separator together is important, and a large number of technical proposals have been made.

As one of the proposals, a technique of using a separator including a polyolefin microporous membrane, which is a conventional separator, and a porous layer made of a polyvinylidene-fluoride-based resin (hereinafter sometimes referred to as an adhesive porous layer) formed thereon is known (see, e.g., Patent Document 1). When such an adhesive porous layer with an electrolyte contained therein is stacked on an electrode and heat-pressed, the electrode and the separator can be well joined together, allowing the adhesive porous layer to function as an adhesive. As a result, it is possible to improve the cycle life of a soft pack battery.

In addition, in the case where a battery is produced using a conventional metal can outer casing, electrodes and a separator are stacked together and wound to produce a battery element, and the element is enclosed in a metal can outer casing together with an electrolyte, thereby producing a battery. Meanwhile, in the case where a soft pack battery is produced using a separator like the separator of Patent Document 1 mentioned above, a battery element is produced in the same manner as for the battery having a metal can outer casing mentioned above, then enclosed in a soft pack outer casing together with an electrolyte, and finally subjected to a heat pressing process, thereby producing a battery. Thus, in the case where a separator including an adhesive porous layer as mentioned above is used, it is possible to produce a battery element in the same manner as for the battery having a metal can outer casing mentioned above. This is advantageous in that there is no need to greatly change the production process for conventional batteries having a metal can outer casing.

Against the background mentioned above, various technical proposals have been made in the past for separators made of a polyolefin microporous membrane and an adhesive porous layer stacked thereon. For example, in terms of achieving both the ensuring of sufficient adhesion and ion permeability, Patent Document 1 presents a new technical proposal focusing on the porous structure and thickness of a polyvinylidene-fluoride-based resin layer.

PRIOR ART DOCUMENTS

Patent Documents

Patent Document 1: Japanese Patent No. 4127989

SUMMARY OF THE INVENTION

Problems that the Invention is to Solve

Incidentally, the positive electrode or negative electrode of an ordinary nonaqueous secondary battery includes a current collector and an active material layer formed on the current collector and containing an electrode active material and a binder resin. In the case where the adhesive porous layer mentioned above is joined to such an electrode by heat pressing, the layer adheres to the binder resin in the electrode. Therefore, in order to ensure better adhesion, the larger the amount of binder resin in the electrode, the better.

However, in order to further increase the energy density of a battery, it is necessary to increase the content of the active material in the electrode, and the lower the binder resin content, the better. Therefore, according to the prior art, in order to ensure sufficient adhesion, it has been necessary to perform heat pressing under severe conditions, such as higher temperatures and higher pressures. Further, according to the prior art, in the case where heat pressing is performed under such severe conditions, there is a problem in that the porous structure of the adhesive porous layer made of a polyvinylidene-fluoride-based resin is destroyed. This results in insufficient ion permeability after the heat pressing process, and it thus has been difficult to obtain good battery characteristics.

In addition, although a polyvinylidene-fluoride-based resin has been commonly used as a binder resin for use in an electrode, in recent years, it is also becoming common to use styrene-butadiene rubber. In the case where such styrene-butadiene rubber is used in an electrode, when the separator has a conventional adhesive porous layer, it has been difficult to obtain sufficient battery characteristics achieving both ion permeability and adhesion.

Against such a background, an object of the invention is to provide a separator for a nonaqueous secondary battery, which has better adhesion to electrodes compared with conventional separators and is also capable of ensuring sufficient ion permeability even after attachment to an electrode.

Means for Solving the Problems

In order to solve the problems mentioned above, the invention is configured as follows.
1. A separator for a nonaqueous secondary battery, including a porous substrate and an adhesive porous layer that is formed on at least one side of the porous substrate and contains a polyvinylidene-fluoride-based resin, the separator for a nonaqueous secondary battery being characterized in that the adhesive porous layer has a crystallinity of 20 to 35%.

2. The separator for a nonaqueous secondary battery according to 1 above, characterized in that the weight of the adhesive porous layer formed on one side of the porous substrate is 0.5 to 1.5 g/m$^2$.

3. The separator for a nonaqueous secondary battery according to 1 or 2 above, characterized in that the adhesive porous layer is formed on both front and back sides of the porous substrate.

4. The separator for a nonaqueous secondary battery according to 3 above, characterized in that the total weight of the adhesive porous layers formed on both sides of the porous substrate is 1.0 g/m$^2$ or more and 3.0 g/m$^2$ or less, and the difference between the weight of the adhesive porous layer on one side and the weight of the adhesive porous layer on the other side is 20% or less of the total weight on both sides.

5. The separator for a nonaqueous secondary battery according to any one of 1 to 4 above, characterized in that the value obtained by subtracting the Gurley value of the porous substrate from the Gurley value of the separator for a nonaqueous secondary battery with the adhesive porous layer formed thereon is 300 sec/100 cc or less.

6. The separator for a nonaqueous secondary battery according to any one of 1 to 5 above, characterized in that the porous substrate is a polyolefin microporous membrane containing polyethylene.

7. The separator for a nonaqueous secondary battery according to any one of 1 to 5 above, characterized in that the porous substrate is a polyolefin microporous membrane containing polyethylene and polypropylene.

8. The separator for a nonaqueous secondary battery according to 7 above, characterized in that the polyolefin microporous membrane includes at least two layers with one of the two layers containing polyethylene and the other layer containing polypropylene.

9. A nonaqueous secondary battery including the separator according to any one of 1 to 8 above.

Advantage of the Invention

According to the invention, it is possible to provide a separator for a nonaqueous secondary battery, which has better adhesion to electrodes compared with conventional separators and is also capable of ensuring sufficient ion permeability even after attachment to an electrode. The use of the separator of the invention makes it possible to provide a high-energy-density, high-performance nonaqueous secondary battery having an aluminum laminate pack outer casing.

BEST MODE FOR CARRYING OUT THE INVENTION

The separator for a nonaqueous secondary battery of the invention includes a porous substrate and an adhesive porous layer formed on at least one side of the porous substrate and containing a polyvinylidene-fluoride-based resin. The separator for a nonaqueous secondary battery is characterized in that the adhesive porous layer has a crystallinity of 20 to 35%. Hereinafter, the invention will be described in detail. Incidentally, a numerical range defined by " . . . to . . . " hereinafter indicates a numerical range including the upper limit and the lower limit.

[Porous Substrate]

In the invention, a porous substrate refers to a substrate having pores or voids inside. Examples of such substrates include a microporous membrane, a porous sheet made of a fibrous material, such as a nonwoven fabric or a paper-like sheet, and a composite porous sheet made of such a microporous membrane or porous sheet and one or more other porous layers stacked thereon. Incidentally, a microporous membrane refers to a membrane having a large number of micropores inside, the micropores being connected to allow gas or liquid to pass therethrough from one side to the other side.

The material forming the porous substrate may be an electrically insulating organic material or inorganic material. In particular, in terms of imparting a shutdown function to the substrate, it is preferable to use a thermoplastic resin as a component of the substrate. Here, a shutdown function refers to the following function: in the case where the battery temperature increases, the thermoplastic resin melts and blocks the pores of the porous substrate, thereby blocking the movement of ions to prevent the thermal runaway of the battery. As the thermoplastic resin, a thermoplastic resin having a melting point of less than 200° C. is suitable, and polyolefins are particularly preferable.

As a porous substrate using a polyolefin, a polyolefin microporous membrane is preferable. As the polyolefin microporous membrane, it is possible to use a polyolefin microporous membrane that has been applied to a conventional nonaqueous secondary battery separator, which has sufficient dynamic physical properties and ion permeability. Further, in terms of having the shutdown function mentioned above, it is preferable that the polyolefin microporous membrane contains polyethylene, and it is preferable that the polyethylene content is 95 wt % or more.

Separately, in terms of imparting heat resistance to such a degree that the membrane does not easily break when exposed to high temperatures, a polyolefin microporous membrane containing polyethylene and polypropylene is preferable. An example of such a polyolefin microporous membrane is a microporous membrane in which both polyethylene and polypropylene are present in one sheet. In terms of achieving both the shutdown function and heat resistance, it is preferable that the microporous membrane contains polyethylene in an amount of 95 wt % or more and polypropylene in an amount of 5 wt % or less. In addition, in terms of achieving both the shutdown function and heat resistance, it is also preferable that the polyolefin microporous membrane is a polyolefin microporous membrane having a laminate structure, which includes at least two layers with one of the two layers containing polyethylene and the other layer containing polypropylene.

It is preferable that the polyolefin has a weight average molecular weight of 100,000 to 5,000,000. When the weight average molecular weight is less than 100,000, it may be difficult to ensure sufficient dynamic physical properties. Meanwhile, when it is more than 5,000,000, shutdown characteristics may deteriorate, or it may be difficult to form a membrane.

The polyolefin microporous membrane can be produced by the following method, for example. That is, it is possible to employ a method in which a microporous membrane is formed by successively performing the following steps: (i) a step of extruding a molten polyolefin resin from a T-die to form a sheet, (ii) a step of subjecting the sheet to a crystallization treatment, (iii) a step of stretching the sheet, and (iv) a step of heat-treating the sheet. In addition, it is also possible to employ a method in which a microporous membrane is formed by successively performing the following steps: (i) a step of melting a polyolefin resin together with a plasticizer such as liquid paraffin and extruding the melt from a T-die, followed by cooling to form a sheet, (ii) a step of stretching the sheet, (iii) a step of extracting the plasticizer from the sheet, and (iv) a step of heat-treating the sheet.

As a porous sheet made of a fibrous material, it is possible to use a porous sheet made of a fibrous material containing a polyester such as polyethylene terephthalate, a polyolefin such as polyethylene or polypropylene, or a heat-resistant polymer such as aromatic polyamide, polyimide, polyethersulfone, polysulfone, polyether ketone, or polyetherimide, or a mixture of such fibrous materials.

A composite porous sheet may be configured to include a microporous membrane or a porous sheet made of a fibrous material and a functional layer stacked thereon. Such a composite porous sheet is preferable because a further function can be imparted by the functional layer. As a functional layer, for example, in terms of imparting heat resistance, it is possible to use a porous layer made of a heat-resistant resin or a porous layer made of a heat-resistant resin and an inorganic filler. The heat-resistant resin may be one or more kinds of heat-resistant polymers selected from aromatic polyamide, polyimide, polyethersulfone, polysulfone, polyether ketone, and polyetherimide. Examples of suitable inorganic fillers include metal oxides such as alumina and metal hydroxides such as magnesium hydroxide. Incidentally, examples of techniques for forming a composite sheet include a method in which a porous sheet is coated with a functional layer, a method in which they are joined together using an adhesive, and a method in which they are bonded together by thermocompression.

In the invention, in terms of obtaining good dynamic physical properties and internal resistance, it is preferable that the porous substrate has a thickness within a range of 5 to 25 µm. In terms of preventing a short circuit in the battery and obtaining sufficient ion permeability, it is preferable that the porous substrate has a Gurley value (JIS P8117) within a range of 50 to 800 sec/100 cc. In terms of improving production yield, it is preferable that the porous substrate has a puncture resistance of 300 g or more.

[Polyvinylidene-Fluoride-Based Resin]

In the separator for a nonaqueous secondary battery of the invention, it is preferable to use a polyvinylidene-fluoride-based resin having a weight average molecular weight of 100,000 to 3,000,000. When a polyvinylidene-fluoride-based resin having a weight average molecular weight of less than 100,000 is applied, this results in low adhesion strength to electrodes and thus is undesirable. In terms of adhesion strength, the weight average molecular weight is more preferably 500,000 or more. In addition, when the weight average molecular weight is more than 3,000,000, the viscosity at the time of layer formation is high, making it difficult to form a layer, or sufficient crystals cannot be formed when obtaining a polyvinylidene fluoride porous structure, making it difficult to obtain a preferred porous structure. Therefore, this is undesirable. In terms of such forming properties, the weight average molecular weight is more preferably 2,000,000 or less, and still more preferably 1,200,000 or less. Here, the weight average molecular weight of a polyvinylidene-fluoride-based resin can be determined by gel permeation chromatography (GPC method).

In the invention, as a polyvinylidene-fluoride-based resin, a homopolymer of vinylidene fluoride (i.e., polyvinylidene fluoride), a copolymer of vinylidene fluoride and another copolymerizable monomer, or a mixture thereof is used. As a monomer copolymerizable with vinylidene fluoride, for example, it is possible to use one or more kinds of tetrafluoroethylene, hexafluoropropylene, trifluoroethylene, trichloroethylene, vinyl fluoride, etc. It is preferable that the polyvinylidene-fluoride-based resin contains as a structural unit vinylidene fluoride in an amount of 70 mol % or more. Further, in terms of ensuring sufficient dynamic physical properties during joining to an electrode, a polyvinylidene-fluoride-based resin containing vinylidene fluoride in an amount of 98 mol % or more is preferable.

Such a polyvinylidene-fluoride-based resin having a relatively high molecular weight can be obtained preferably by emulsion polymerization or suspension polymerization, and particularly preferably by suspension polymerization.

[Adhesive Porous Layer]

In the separator for a nonaqueous secondary battery of the invention, it is necessary that the adhesive porous layer made of a polyvinylidene-fluoride-based resin has a crystallinity within a range of 20 to 35%. Here, an adhesive porous layer refers to a porous layer containing a polyvinylidene-fluoride-based resin and having a large number of micropores inside, the micropores being connected to allow gas or liquid to pass therethrough from one side to the other side. In addition, the crystallinity can be calculated from the integrated intensity of the diffraction peak obtained by X-ray diffraction analysis.

When the crystallinity is less than 20%, it is difficult to maintain the porous structure of the adhesive porous layer after attachment to an electrode, causing the deterioration of the battery characteristics of a nonaqueous secondary battery, such as load characteristics and cycle characteristics. When the crystallinity is more than 35%, this leads to insufficient adhesion to electrodes and thus is undesirable.

It is believed that the amorphous part of the polyvinylidene-fluoride-based resin contributes to the adhesion to electrodes. From such a point of view, an adhesive porous layer having low crystallinity has better adhesion to electrodes than an adhesive porous layer having high crystallinity. In particular, the invention is greatly advantageous in that when the adhesive porous layer has a crystallinity within a range of 20 to 35%, sufficient adhesion to electrodes can be ensured even under mild heat-pressing conditions, and good adhesion is exhibited regardless of the kind of electrode binder resin or electrolyte. When sufficient adhesion strength can be ensured even under mild heat-pressing conditions, the porous structure of the adhesive porous layer is not destroyed by heat pressing, whereby the adhesive porous layer can be prevented from melting and being pushed out from the interface between an electrode and the polyolefin microporous membrane, or ion permeability after attachment can be prevented from being inhibited due to clogging. In addition, when good adhesion can be obtained regardless of the kind of electrode binder resin or electrolyte, components of a battery can be selected from a wider variety of choices and combinations, making it possible to produce various nonaqueous secondary batteries.

Several techniques can be mentioned as examples of methods for controlling the crystallinity of the adhesive porous layer. For example, the temperature in a coagulation step for forming an adhesive porous layer is one factor. A decrease in this temperature tends to reduce the crystallinity. In addition, the selection of a polyvinylidene-fluoride-based resin is another important factor. An increase in the molecular weight of the polyvinylidene-fluoride-based resin tends to reduce the crystallinity, and when a polyvinylidene-fluoride-based resin having a weight average molecular weight of 500,000 or more is used, the suitable crystallinity of the invention can be easily achieved. In addition, the addition of a copolymer component to polyvinylidene fluoride reduces the crystallinity. In terms of polymer structure, polyvinylidene fluoride in which $CF_2$ and $CH_2$ are randomly arranged has lower crystallinity, and such a polymer can be obtained more easily by emulsion polymerization than by suspension polymerization. In addition, polyvinylidene fluoride having a developed branched structure tends to be more difficult to crystallize, and one with wider molecular weight distribution tends to have lower crystallinity. Further, the composition of a coating liquid is another factor that controls the crystallinity, and a decrease in the amount of phase-separation agent added to the coating liquid tends to reduce the crystallinity. These controlling factors are factors that also contribute to the formation of a porous structure, so it is not desirable to exert control in terms of crystallinity control. It is preferable that the above controlling factors are applied in combination in terms of both crystallinity and porous structure. Naturally, the suitable ranges of conditions, such as the coating liquid composition and the coagulation temperature, vary depending on the resin selected, and thus the preferred range of each condition cannot be generally specified.

Incidentally, in the invention, for the purpose of improving the slidability and heat resistance of the separator, it also possible to incorporate a filler made of an inorganic substance or organic substance or other additives into the adhesive porous layer. In such a case, it is preferable that the contents or particle sizes thereof are to such a degree that the effect of the invention is not inhibited. Examples of usable inorganic fillers include the metal oxides and metal hydroxides mentioned above. Examples of usable organic fillers include acrylic resin.

[Separator for Nonaqueous Secondary Battery]

As mentioned above, the separator for a nonaqueous secondary battery of the invention includes a porous substrate and an adhesive porous layer formed on at least one side of the porous substrate and containing a polyvinylidene-fluoride-based resin. Here, the adhesive porous layer is an adhesive layer to be attached, with an electrolyte contained therein, to an electrode by heat pressing. Therefore, it is necessary that the adhesive porous layer is present as the outermost layer of the separator. Naturally, in terms of cycle life, it is preferable that the separator is attached to both the positive electrode and the negative electrode. Therefore, it is preferable that the adhesive porous layer is formed on the front and back of the porous substrate.

In the invention, in terms of ion permeability, it is preferable that the adhesive porous layer has a structure that is sufficiently porous. Specifically, it is preferable that the value obtained by subtracting the Gurley value of the porous substrate from the Gurley value of the separator for a nonaqueous secondary battery with the adhesive porous layer formed thereon is 300 sec/100 cc or less, more preferably 150 sec/100 cc or less, and still more preferably 100 sec/100 cc or less. In the case where the difference is more than 300 sec/100 cc, the adhesive porous layer may be so dense that ion permeation is inhibited, whereby sufficient battery characteristics may not be obtained.

In terms of obtaining sufficient battery performance, it is preferable that the separator for a nonaqueous secondary battery of the invention has a Gurley value within a range of 50 sec/100 cc or more and 800 sec/100 cc or less.

In order for the effect of the invention and the dynamic physical properties of the separator to be well obtained, a suitable range of the porosity of the separator for a nonaqueous secondary battery is 30% or more and 60% or less.

It is preferable that the weight of the polyvinylidene-fluoride-based resin is within a range of 0.5 to 1.5 g/m$^2$ on one side. When the weight is less than 0.5 g/m$^2$, the adhesion to electrodes may be insufficient. Meanwhile, a weight of more than 1.5 g/m$^2$ tends to inhibit ion permeability and deteriorate the load characteristics of the battery, and thus is undesirable.

In the case where the porous layer made of a polyvinylidene-fluoride-based resin is formed on both front and back sides, it is preferable that the weight of the polyvinylidene-fluoride-based resin is 1.0 to 3.0 g/m$^2$.

In the invention, in the case where the adhesive porous layer is formed on both sides of the porous substrate, the difference between the weight on the front side and the weight on the back side is also important. Specifically, it is preferable that the total weight of the adhesive porous layers formed on the front and back of the porous substrate is 1.0 to 3.0 g/m$^2$, and the difference between the weight of the adhesive porous layer on one side and the weight of the adhesive porous layer on the other side is 20% or less of the total weight on both sides. When the difference is more than 20%, this may result in significant curling, interfering with handling or deteriorating cycle characteristics.

[Method for Producing Separator for Nonaqueous Secondary Battery]

The separator for a nonaqueous secondary battery of the invention mentioned above can be produced by a method in which a solution containing a polyvinylidene-fluoride-based resin is applied directly onto a porous substrate, and then the polyvinylidene-fluoride-based resin is solidified to integrally form an adhesive porous layer on the porous substrate.

Specifically, first, a polyvinylidene-fluoride-based resin is dissolved in a solvent to prepare a coating liquid. The coating liquid is applied onto a porous substrate, followed by immersion in a suitable coagulation liquid. As a result, the polyvinylidene-fluoride-based resin is solidified while inducing a phase separation phenomenon. In this step, the polyvinylidene-fluoride-based resin layer has a porous structure. Subsequently, the porous substrate is washed with water to remove the coagulation liquid, followed by drying to integrally form an adhesive porous layer on the porous substrate.

For the coating liquid, a good solvent that dissolves the polyvinylidene-fluoride-based resin can be used. Examples of suitable good solvents include polar amide solvents such as N-methylpyrrolidone, dimethylacetamide, dimethylformamide, and dimethylformamide. In terms of forming a good porous structure, in addition to the above-mentioned good solvents, a phase-separation agent that induces phase separation is preferably mixed. Examples of phase-separation agents include water, methanol, ethanol, propyl alcohol, butyl alcohol, butanediol, ethylene glycol, propylene glycol, and tripropylene glycol. It is preferable that such a phase-separation agent is added within a range where viscosity suitable for coating can be ensured. In addition, in the case where a filler or other additives are incorporated into the adhesive porous layer, they may be mixed or dissolved into the coating liquid.

The composition of the coating liquid is preferably such that the polyvinylidene-fluoride-based resin is contained at a concentration of 3 to 10 wt %. In terms of forming a suitable porous structure and controlling crystallinity, it is preferable that the solvent is a mixed solvent containing a good solvent in an amount of 60 wt % or more and a phase-separation agent in an amount of 40 wt % or less.

As the coagulation liquid, it is possible to use water, a mixed solvent of water and the good solvent, or a mixed solvent of water, the good solvent, and the phase-separation agent. In particular, a mixed solvent of water, the good solvent, and the phase-separation agent is preferable. In such a case, in terms of productivity, it is preferable that the mixing ratio between the good solvent and the phase-separation agent is determined according to the mixing ratio of the mixed solvent used for dissolving the polyvinylidene-fluoride-based resin. In terms of forming a good porous structure and improving productivity, it is preferable that the concentration of water is 40 to 90 wt %. In terms of controlling crystallinity, it is preferable that the coagulation temperature is about −20 to 60° C.

For the application of the coating liquid to a porous substrate, a conventional coating technique can be employed, such as Mayer bar, die coater, reverse roll coater, or gravure coater. In the case where the adhesive porous layer is formed on both sides of the porous substrate, it is possible that the coating liquid is applied to one side and then to the other, coagulated, washed with water, and dried. However, in terms of productivity, it is preferable that the coating liquid is applied to both sides of the porous substrate simultaneously, coagulated, washed with water, and dried.

Incidentally, in addition to the wet coating method mentioned above, the separator of the invention can also be produced by a dry coating method. Here, a dry coating method is a method in which the coating liquid containing a polyvinylidene-fluoride-based resin and a solvent is applied onto a porous substrate and then dried to remove the solvent by volatilization, thereby obtaining a porous membrane. However, in the case of a dry coating method, as compared with a wet coating method, it is more likely that the resulting coating is a dense membrane, and it is almost impossible to obtain a porous layer unless a filler or the like is added to the coating liquid. In addition, even when such a filler or the like is added, it is difficult to obtain a good porous structure. Therefore, from such a point of view, it is preferable to use a wet coating method in the invention.

In addition, the separator of the invention can also be produced by a method in which an adhesive porous layer and a porous substrate are separately produced, and then these sheets are stacked together and combined by thermocompression bonding or using an adhesive, etc. The method for obtaining an adhesive porous layer as an independent sheet may be, for example, a method in which a coating liquid is applied onto a release sheet, then an adhesive porous layer is formed by the wet coating method or dry coating method mentioned above, and only the adhesive porous layer is peeled off.

[Nonaqueous Secondary Battery]

The nonaqueous secondary battery of the invention is characterized by using the separator of the invention mentioned above.

In the invention, a nonaqueous secondary battery has a configuration in which the separator is placed between a positive electrode and a negative electrode, and these battery elements are enclosed in an outer casing together with an electrolyte. As the nonaqueous secondary battery, a lithium ion secondary battery is preferable.

As the positive electrode, a configuration in which an electrode layer made of a positive electrode active material, a binder resin, and a conductive additive is formed on a positive electrode current collector can be applied. Examples of positive electrode active materials include lithium cobalt oxide, lithium nickel oxide, lithium manganese oxide having a spinel structure, and lithium iron phosphate having an olivine structure. In the invention, in the case where the adhesive porous layer of the separator is placed on the positive-electrode side, because of the excellent oxidation resistance of the polyvinylidene-fluoride-based resin, there also is an advantage in that a positive electrode active material that can be operated at a high voltage of 4.2 V or more, such as $LiMn_{1/2}Ni_{1/2}O_2$ or $LiCo_{1/3}Mn_{1/3}Ni_{1/3}O_2$, can be easily applied. Examples of binder resins include polyvinylidene-fluoride-based resins. Examples of conductive additives include acetylene black, ketjen black, and graphite powder. Examples of current collectors include an aluminum foil having a thickness of 5 to 20 μm.

As the negative electrode, a configuration in which an electrode layer made of a negative electrode active material and a binder resin is formed on a negative electrode current collector can be applied. A conductive additive may also be added to the electrode layer as necessary. Examples of usable negative electrode active materials are carbon materials capable of electrochemically storing lithium, materials capable of alloying with lithium, such as silicon and tin, and the like. Examples of binder resins include polyvinylidene-fluoride-based resins and styrene-butadiene rubber. The separator for a nonaqueous secondary battery of the invention has good adhesion. Therefore, sufficient adhesion can be ensured not only when a polyvinylidene-fluoride-based resin is used as a negative electrode binder, but also in the case of using styrene-butadiene rubber. In addition, examples of conductive additives include acetylene black, ketjen black, and graphite powder. Examples of current collectors include a copper foil having a thickness of 5 to 20 μm. In addition, instead of the negative electrode mentioned above, a metal lithium foil may also be used as a negative electrode.

The electrolyte has a configuration in which a lithium salt is dissolved in a suitable solvent. Examples of lithium salts include $LiPF_6$, $LiBF_4$, and $LiClO_4$. Examples of suitable solvents include cyclic carbonates such as ethylene carbonate, propylene carbonate, fluoroethylene carbonate, and difluoroethylene carbonate, open-chain carbonates such as dimethyl carbonate, diethyl carbonate, ethyl methyl carbonate, and fluorine substitution products thereof, cyclic esters such as γ-butyrolactone and γ-valerolactone, and mixed solvents thereof. In particular, a solvent obtained by dissolving a lithium salt in a solvent containing cyclic carbonate/open-chain carbonate in a weight ratio of 20 to 40/80 to 60 at a concentration of 0.5 to 1.5 M is preferable. Incidentally, in a separator including a conventional adhesive porous layer, depending on the kind of electrolyte used, adhesion to electrodes is sometimes hardly exhibited. However, in the separator of the invention, good adhesion can be exhibited regardless of the kind of electrolyte. The invention is also greatly advantageous in this respect.

The separator for a nonaqueous secondary battery of the invention is applicable to a battery having a metal can outer casing. However, because of its good adhesion to electrodes, the separator of the invention is suitable for use in a soft pack battery having an aluminum laminate film outer casing. The method for producing such a battery is as follows. The positive electrode and negative electrode mentioned above are joined together via the separator, impregnated with an electrolyte, enclosed in an aluminum laminate film, and then heat-pressed, whereby a nonaqueous secondary battery can be obtained. This configuration of the invention allows the electrodes and the separator to be well attached together, making it possible to obtain a nonaqueous secondary battery having excellent cycle life. In addition, because of the good adhesion between the electrodes and the separator, the battery also has excellent safety. Examples of methods for joining the electrodes and the separator together include a stacking method in which the electrodes and the separator are stacked together and a method in which the electrodes and the separator are wound together. The invention is applicable to any of such methods.

EXAMPLES

Hereinafter, the invention will be described with reference to examples. However, the invention is not limited to the following examples.

[Measurement Method]
(Method for Measuring Crystallinity of Porous Layer made of Polyvinylidene-Fluoride-Based Resin)

A polyvinylidene-fluoride-based resin peeled off from a separator was used as a sample and measured for crystallinity by X-ray diffraction analysis. The measurement was performed using "NANO-Viewer" (manufactured by Rigaku) at 25° C. by a transmission method. An imaging plate was used for detection. The two-dimensional data obtained using the imaging plate were converted into 2θ profiles, and the region at 2θ=8 to 30° was curve-fitted (Gauss function/Lorentz function=50/50) to determine the peak integrated intensities Ic and Ia of the crystalline component and amorphous component, respectively. Crystallinity Xc (%) was calculated from the following equation 1.

$$Xc=\{Ic/(Ic+Ia)\}\times 100 \quad (1)$$

(Method for Measuring Membrane Thickness)

Measurement was performed using a contact thickness meter (LITEMATIC, manufactured by Mitutoyo). Using a cylindrical measuring terminal having a diameter of 5 mm, the thickness was measured with adjustment so that a load of 7 g was applied during the measurement.

(Weight Per Unit)

A 10 cm×10 cm sample was cut out and measured for weight. The weight was divided by the area to determine the weight per unit.

(Weight of Polyvinylidene-Fluoride-Based Resin)

Using an energy dispersion fluorescent X-ray analyzer (EDX-800HS, Shimadzu), the weight of a polyvinylidene-fluoride-based resin was measured from the intensity of the FKα spectrum. In the measurement, the weight of the polyvinylidene-fluoride-based resin on the X-ray irradiated side is measured. Therefore, in the case where a porous layer made of a polyvinylidene-fluoride-based resin is formed on both front and back sides, the front and back are each subjected to the measurement. Thus, the weight of the polyvinylidene-fluoride-based resin on each of the front and backsides is measured, and the weights are summed to determine the total weight on the front and back sides.

(Porosity)

The porosity ε (%) of a complex separator was calculated from the following equation 2.

$$\varepsilon=\{1-(Wa/0.95+Wb/1.78)/t\}\times 100 \quad (2)$$

Here, Wa is the weight per unit of a substrate (g/m²), Wb is the weight of a polyvinylidene-fluoride-based resin (g/m²), and t is the membrane thickness (μm).

(Gurley Value)

Measurement was performed in accordance with JIS P8117 using a Gurley densometer (G-B2C, manufactured by Toyo Seiki Seisaku-Sho).

Example 1

KYNAR2851 manufactured by ARKEM, a vinylidene fluoride-hexafluoropropylene copolymer, was used as a polyvinylidene-fluoride-based resin. The polyvinylidene-fluoride-based resin was dissolved in a mixed solvent containing dimethylacetamide/tripropylene glycol in a weight ratio of 7/3 at 8 wt % to prepare a coating liquid. Equal amounts of the coating liquid were applied respectively to both sides of a polyethylene microporous membrane (TN0901, manufactured by SK) having a thickness of 9 μm, a Gurley value of 160 sec/100 cc, and a porosity of 43%, followed by immersion in a coagulation liquid (10° C.) containing water/dimethylacetamide/tripropylene glycol in a weight ratio of 57/30/13 to cause solidification. The microporous membrane was then washed with water, followed by drying to give a separator for a nonaqueous secondary battery according to the invention having a porous layer made of a polyvinylidene-fluoride-based resin on both front and back sides of the polyolefin-based microporous membrane. The separator was measured for the following properties: the crystallinity of the adhesive porous layer (the crystallinity of the PVdF-based resin), the membrane thickness, weight per unit, and porosity of the separator, the weight of the adhesive porous layer (the total weight on both sides, the weight on the front side, the weight on the back side, and the percentage of the difference between the weight on the front side and the weight on the back side relative to the total weight on both sides), and the Gurley value of the separator. The results are shown in Table 1. Incidentally, the results from the separators of the following examples and comparative examples are also shown in Table 1.

Example 2

A separator for a nonaqueous secondary battery according to the invention was produced in the same manner as in Example 1, except that Hylar460 manufactured by Solvay, which is a polyvinylidene fluoride obtained by emulsion polymerization, was used as a polyvinylidene-fluoride-based resin, and that the temperature of the coagulation liquid was set at 40° C.

Example 3

A separator for a nonaqueous secondary battery was produced in the same manner as in Example 1, except that Solef1015 manufactured by Solvay, which is a polyvinylidene fluoride having a weight average molecular weight of 573×10³, was used as a polyvinylidene-fluoride-based resin.

Example 4

A polyvinylidene-fluoride-based resin having a copolymerization composition of vinylidene fluoride/hexafluoropropylene/chlorotrifluoroethylene in a weight ratio of 88.0/6.5/5.5 was produced by emulsion polymerization. The weight average molecular weight of the polyvinylidene-fluoride-based resin was 410,000. The polyvinylidene fluoride was dissolved in a mixed solvent containing dimethylacetamide/tripropylene glycol in a weight ratio of 55/45 at 8 wt % to prepare a coating liquid. Equal amounts of the coating liquid were applied respectively to both sides of a polyethylene microporous membrane (TN0901, manufactured by SK) having a thickness of 9 μm, a Gurley value of 160 sec/100 cc, and a porosity of 43%, followed by immersion in a coagulation liquid (20° C.) containing water/dimethylacetamide/tripropylene glycol in a weight ratio of 50/30/20 to cause solidification. The microporous membrane was then washed with water, followed by drying to give a separator for a nonaqueous secondary battery according to the invention having a porous layer made of a polyvinylidene-fluoride-based resin on both front and back sides of the polyolefin-based microporous membrane.

Examples 5 to 8

Separators for a nonaqueous secondary battery according to the invention were obtained using the same coating liquid, the same polyethylene microporous membrane, and the same method as in Example 1, except that only the amount applied was changed as shown in Table 1.

Examples 9 and 10

Separators for a nonaqueous secondary battery according to the invention were obtained using the same coating liquid, the same polyethylene microporous membrane, and the same method as in Example 1, except that only the amounts applied to the front and back sides were changed as shown in Table 1.

Example 11

A separator for a nonaqueous secondary battery according to the invention was obtained in the same manner as in Example 1, except that a polyolefin microporous membrane (M824, manufactured by Celgard) having a three-layer structure including polypropylene/polyethylene/polypropylene with a thickness of 12 μm, a Gurley value of 425 sec/100 cc, and a porosity of 38% was used as a polyolefin microporous membrane.

Comparative Example 1

A separator for a nonaqueous secondary battery was produced in the same manner as in Example 1, except that the temperature of the coagulation liquid was 40° C.

Comparative Example 2

A separator for a nonaqueous secondary battery was produced in the same manner as in Example 2, except that KYNAR741 manufactured by ARKEM, which is a polyvinylidene fluoride obtained by suspension polymerization, was used as a polyvinylidene-fluoride-based resin.

Comparative Example 3

A separator for a nonaqueous secondary battery was produced in the same manner as in Example 3, except that Solef1008 manufactured by Solvay, which is a polyvinylidene fluoride having a weight average molecular weight of $244 \times 10^3$, was used as a polyvinylidene-fluoride-based resin.

Comparative Example 4

A polyvinylidene-fluoride-based resin having a copolymerization composition of vinylidene fluoride/hexafluoropropylene/chlorotrifluoroethylene in a weight ratio of 96.0/2.5/1.5 was produced by emulsion polymerization. The weight average molecular weight of the polyvinylidene-fluoride-based resin was 410,000. A separator for a nonaqueous secondary battery was obtained in the same manner as in Example 4, except for using this polyvinylidene fluoride.

Comparative Example 5

A polyvinylidene-fluoride-based resin having a copolymerization composition of vinylidene fluoride/hexafluoropropylene/chlorotrifluoroethylene in a weight ratio of 61.0/20.0/19.0 was produced by emulsion polymerization. The weight average molecular weight of the polyvinylidene-fluoride-based resin was 410,000. A separator for a nonaqueous secondary battery was obtained in the same manner as in Example 4, except that this polyvinylidene fluoride was used and the temperature of the coagulation liquid was set at 0° C.

Comparative Example 6

A polyvinylidene-fluoride-based resin having a copolymerization composition of vinylidene fluoride/hexafluoropropylene/chlorotrifluoroethylene in a weight ratio of 92.0/4.5/3.5 was produced by emulsion polymerization. The weight average molecular weight of the polyvinylidene-fluoride-based resin was 410,000. The polyvinylidene fluoride was dissolved in a mixed solvent containing dimethylacetamide/tripropylene glycol in a weight ratio of 60/40 at 12 wt % to prepare a coating liquid. Equal amounts of the coating liquid were applied respectively to both sides of a polyethylene microporous membrane (TN0901, manufactured by SK) having a thickness of 9 μm, a Gurley value of 160 sec/100 cc, and a porosity of 43%, followed by immersion in a coagulation liquid (40° C.) containing water/dimethylacetamide/tripropylene glycol in a weight ratio of 50/30/20 to cause solidification. The microporous membrane was then washed with water, followed by drying to give a separator for a nonaqueous secondary battery having a porous layer made of a polyvinylidene-fluoride-based resin on the polyolefin-based microporous membrane.

Comparative Example 7

Equal amounts of a 3 mass % dimethyl carbonate solution of a vinylidene fluoride/hexafluoropropylene copolymer (#8500, manufactured by Kureha Kagaku Kogyo) were applied respectively to both sides of a polyethylene microporous membrane (TN0901, manufactured by SK) having a thickness of 9 μm, a Gurley value of 160 sec/100 cc, and a porosity of 43%, and dried. However, the resulting coating was a dense membrane, and a separator for a nonaqueous secondary battery having an adhesive porous layer was not obtained. Incidentally, the Gurley value of the composite membrane was measured. The result was not less than 2,000 sec/100 cc, indicating significantly poor permeability.

[Test for Adhesion to Electrodes]
(Production of Negative Electrode)

300 g of artificial graphite (MCMB25-28, manufactured by Osaka Gas Chemicals) as a negative electrode active material, 7.5 g of "BM-400B" manufactured by Zeon (a water-soluble dispersion containing a modification product of a styrene-butadiene copolymer in an amount of 40 wt %) as a binder, 3 g of carboxymethylcellulose as a thickener, and an appropriate amount of water were stirred in a double-arm mixer to prepare a slurry for a negative electrode. The slurry for a negative electrode was applied to a copper foil having a thickness of 10 μm as a negative electrode current collector, and the resulting coating was dried, followed by pressing to prepare a negative electrode having a negative electrode active material layer.

(Production of Positive Electrode)

89.5 g of a powder of lithium cobalt oxide (CELLSEED C, manufactured by Nippon Chemical Industrial) as a positive electrode active material, 4.5 g of acetylene black (DENKA BLACK, manufactured by Denki Kagaku Kogyo) as a conductive additive, and 6.0 g of polyvinylidene fluoride (KF polymer W#1100, manufactured by Kureha Kagaku Kogyo) as a binder were dissolved in NMP, and the resulting solution was stirred in a double-arm mixer in such a manner that the polyvinylidene fluoride was in an amount of 6 wt %, thereby preparing a slurry for a positive electrode. The slurry for a positive electrode was applied to an aluminum foil having a thickness of 20 μm as a positive electrode current collector, and the resulting coating was dried, followed by pressing to prepare a positive electrode having a positive electrode active material layer.

(Adhesion Test Method)

The positive and negative electrodes produced above were joined together via a separator and impregnated with an electrolyte. This battery element was enclosed in an aluminum laminate pack using a vacuum sealer to produce a test cell. Here, 1 M LiPF$_6$ ethylene carbonate/ethyl methyl carbonate (weight ratio: 3/7) was used as the electrolyte. The test cell was pressed in a heat press. The cell was then disassembled and measured for peel strength to evaluate adhesion. Two sets of pressing conditions were tested. The first conditions (Adhesion Test 1) were such that a load of 20 kg was applied per cm$^2$ of electrode, the temperature was 90° C., and the time was 2 minutes. The second conditions (Adhesion Test 2) were such that a load of 20 kg was applied per cm$^2$ of electrode, the temperature was 70° C., and the time was 2 minutes.

[Relationship between Crystallinity of Adhesive Porous Layer and Adhesion]

The above adhesion test was performed on Examples 1 to 4 and Comparative Examples 1 to 6. The results are shown in Table 2 as relative values taking the peel strength in the case of using the separator of Example 1 as 100. Table 2 shows that on both positive and negative electrodes, the adhesion to electrodes depends on the crystallinity of a polyvinylidene-fluoride-based resin. This tendency is particularly pronounced on the negative-electrode side where styrene-butadiene rubber was applied as a binder resin. From the results in Table 2, it is judged that a polyvinylidene-fluoride-based resin having a crystallinity of 35% or less leads to good adhesion to electrodes.

[Relationship between Crystallinity of Adhesive Porous Layer and Ion Permeability after Attachment]

In order to evaluate the ion permeability after attachment of each sample, a battery load characteristic test was performed as follows. First, a positive electrode and a negative electrode were produced in the same manner as for the electrodes used in the "Test for Adhesion to Electrodes" above. A lead tab was welded to the positive electrode and the negative electrode. The positive and negative electrodes were then joined together via a separator, impregnated with an electrolyte, and enclosed in an aluminum pack using a vacuum sealer. Here, 1 M LiPF$_6$ ethylene carbonate/ethyl methyl carbonate (weight ratio: 3/7) was used as the electrolyte. The aluminum pack was then heat-pressed in a heat press at 90° C. for 2 minutes while applying a load of 20 kg per cm$^2$ of electrode, thereby producing a test battery. For the load characteristics of the battery, the relative discharge capacity at 2 C with respect to the discharge capacity at 0.2 C was measured at 25° C. and used as an index of ion permeability after attachment.

Table 2 shows the results of the battery load characteristic test on batteries using the separators of Examples 1 to 4 and Comparative Examples 1 to 6. As shown by the results in Table 2, it is shown that in the case where a separator according to the invention is used, even after electrodes and the separator are attached together in a heat press, the porous structure of the adhesive porous layer is maintained, and good load characteristics are obtained. That is, it is shown that a polyvinylidene-fluoride-based resin porous layer having a crystallinity of 20 to 35% also leads to good ion permeability after attachment to an electrode.

[Relationship between Crystallinity of Adhesive Porous Layer and Cycle Characteristics]

Each sample was subjected to a battery cycle test as follows. First, a positive electrode and a negative electrode were produced in the same manner as for the electrodes used in the "Test for Adhesion to Electrodes" above. A lead tab was welded to the positive electrode and the negative electrode. The positive and negative electrodes were then joined together via a separator, impregnated with an electrolyte, and enclosed in an aluminum pack using a vacuum sealer. Here, 1 M LiPF$_6$ ethylene carbonate/ethyl methyl carbonate (weight ratio: 3/7) was used as the electrolyte. The aluminum pack was then heat-pressed in a heat press at 90° C. for 2 minutes while applying a load of 20 kg per cm$^2$ of electrode, thereby producing a test battery. The charge condition was constant-current constant-voltage charge at 1 C and 4.2 V, while the discharge condition was constant-current discharge at 1 C and 2.75 V cut-off, and the cycle characteristics were thus tested. Here, capacity retention after 100 cycles was used as an index of cycle characteristics.

The above battery cycle test was performed on batteries using the separators of Examples 1 to 4 and Comparative Examples to 6. The results are shown in Table 2. The cycle characteristics of the batteries using the separators of Comparative Examples 1 to 4 having insufficient adhesion are significantly lower than those of the batteries using the separators of Examples 1 to 4. This shows that adhesion is important in terms of the cycle life of a battery. The separator of Comparative Example 5 has good adhesion, but the cycle characteristics of the battery using the same are poor. It is likely that because this separator has a high Gurley value and poor ion permeability, sufficient cycle characteristics are not obtained. The reason for the high Gurley value is that the porous layer made of a polyvinylidene-fluoride-based resin is not sufficiently porous, and the reason why a sufficient porous structure is not obtained is that the crystallinity is so low that it is difficult to maintain its structure during layer formation.

[Relationship between Weight of Polyvinylidene-Fluoride-Based Resin and Adhesion]

The above Test 1 for adhesion to electrodes was performed also on Examples 1 and 5 to 8. The results are shown in Table 3 as relative values taking the peel strength in the case of using the separator of Example 1 as 100. It is shown that although the effect is not as much as that of crystallinity, the weight of a polyvinylidene-fluoride-based resin also affects adhesion, and it was found that when the weight on one side is less than 0.5 g/m$^2$, adhesion tends to decrease. Therefore, in terms of ensuring sufficient adhesion, it is more preferable that the weight of a polyvinylidene-fluoride-based resin on one side is 0.5 g/m$^2$ or more.

[Relationship between Weight of Polyvinylidene-Fluoride-Based Resin and Load Characteristics]

The above battery load characteristic test was performed on Examples 1 and 5 to 8. The relative discharge capacity at 2 C with respect to the discharge capacity at 0.2 C was used as an index. The results are shown in Figure 3. It is found that an increase in the weight of a polyvinylidene-fluoride-based resin tends to deteriorate discharge properties. This is because a porous layer made of the polyvinylidene-fluoride-based resin increases the battery internal resistance. When the weight of a polyvinylidene-fluoride-based resin on one side is more than 1.5 g/m$^2$, the deterioration of discharge properties slightly increases. Therefore, it is particularly preferable that the weight of a polyvinylidene-fluoride-based resin on one side is 1.5 g/m$^2$ or less.

[Relationship between Difference in Weight of Polyvinylidene-Fluoride-Based Resin between Front and Back Sides and Cycle Characteristics]

The cycle characteristics of batteries using the separators of Examples 1, 9, and 10 were evaluated according to the above method. The results are shown in Table 4. Table 4 shows that an increase in the difference in polyvinylidene-fluoride-based resin weight between the front and back sides deteriorates cycle characteristics. This is likely to be because a difference in adhesion or ion mobility exists between the front and back sides, and, as the cycle is repeated, the effect of such non-uniformity is exerted. In addition, the separators of Examples 9 and 10 tend to slightly curl, and there also is a possibility that such dynamic strain also has some effect. From such a point of view, it is shown that the difference in polyvinylidene-fluoride-based resin weight between the front and back sides, as indicated by {|weight on the front−weight on the back|}/total weight}×100, is more preferably 20% or less.

[Heat Resistance Evaluation]

The heat resistance of the separator of Example 1 and that of the separator of Example 11 were compared by thermal mechanical analysis (TMA). Each separator was cut out to a width of 4 mm and set to a chuck-to-chuck distance of 10 mm. Under an applied load of 10 mN, the temperature was raised at a temperature rise rate of 10° C./min, and the temperature at which the separator broke was measured. It was found that the separator of Example 1 broke at 155° C., while the separator of Example 11 broke at 180° C. This shows that the use of polypropylene is preferable in terms of heat resistance.

[Kind of Electrolyte and Adhesion]

The separators of Example 1 and Comparative Examples 1 to 6 were subjected to Test 1 for adhesion to electrodes in the same manner as above using various electrolytes. Incidentally, 1 M $LiPF_6$ ethylene carbonate/ethyl methyl carbonate (weight ratio: 3/7) was used as an electrolyte A, 1 M $LiPF_6$ ethylene carbonate/propylene carbonate/ethyl methyl carbonate (weight ratio: 3/2/5) was used as an electrolyte B, and 1 M $LiPF_6$ ethylene carbonate/propylene carbonate (weight ratio: 1/1) was used as an electrolyte C. Table 5 shows the results. Incidentally, in Table 5, in terms of the average of peel strengths on the positive electrode and the negative electrode expressed as relative values with respect to the peel strengths of the separator of Example 1 obtained on the positive electrode and the negative electrode, respectively, each taken as 100, an average of 70 or more is shown as Good, an average of 50 or more and less than 70 is shown as Fair, an average of less than 50 is shown as Poor.

TABLE 1

| | Crystallinity of PVdF-Based Resin (%) | Membrane Thickness (μm) | Weight per Unit (g/m²) | Porosity (%) | Weight of PVdF-Based Resin (g/m²) | | | | Gurley Value (sec/100 cc) |
|---|---|---|---|---|---|---|---|---|---|
| | | | | | Total | Front | Back | Difference between Front and Back | |
| Example 1 | 30 | 12 | 7.5 | 40 | 2.0 | 1.0 | 1.0 | 0% | 255 |
| Example 2 | 31 | 12 | 7.5 | 41 | 2.0 | 1.0 | 1.0 | 0% | 241 |
| Example 3 | 33 | 12 | 7.5 | 41 | 2.0 | 1.0 | 1.0 | 0% | 235 |
| Example 4 | 29 | 12 | 7.5 | 41 | 2.0 | 1.0 | 1.0 | 0% | 248 |
| Example 5 | 30 | 11 | 6.3 | 41 | 0.8 | 0.4 | 0.4 | 0% | 232 |
| Example 6 | 30 | 11 | 6.7 | 41 | 1.2 | 0.6 | 0.6 | 0% | 243 |
| Example 7 | 30 | 12 | 8.3 | 40 | 2.8 | 1.4 | 1.4 | 0% | 271 |
| Example 8 | 30 | 13 | 8.7 | 40 | 3.2 | 1.6 | 1.6 | 0% | 295 |
| Example 9 | 30 | 12 | 7.7 | 40 | 2.2 | 1.3 | 0.9 | 18% | 260 |
| Example 10 | 30 | 12 | 7.7 | 40 | 2.2 | 1.6 | 0.6 | 45% | 259 |
| Example 11 | 30 | 14 | 9.6 | 35 | 2.0 | 1.0 | 1.0 | 0% | 510 |
| Comparative Example 1 | 41 | 14 | 7.5 | 51 | 2.0 | 1.0 | 1.0 | 0% | 200 |
| Comparative Example 2 | 43 | 14 | 7.5 | 52 | 2.0 | 1.0 | 1.0 | 0% | 196 |
| Comparative Example 3 | 46 | 14 | 7.5 | 49 | 2.0 | 1.0 | 1.0 | 0% | 197 |
| Comparative Example 4 | 40 | 14 | 7.5 | 52 | 2.0 | 1.0 | 1.0 | 0% | 205 |
| Comparative Example 5 | 5 | 11 | 7.5 | 38 | 2.0 | 1.0 | 1.0 | 0% | 1,000 |
| Comparative Example 6 | 39 | 14 | 7.5 | 50 | 2.0 | 1.0 | 1.0 | 0% | 211 |

TABLE 2

| | Adhesion Test 1 | | Adhesion Test 2 | | Battery Load | |
|---|---|---|---|---|---|---|
| | Positive-Electrode Side | Negative-Electrode Side | Positive-Electrode Side | Negative-Electrode Side | Characteristic Test | Battery Cycle Test |
| Example 1 | 100 | 100 | 100 | 100 | 96% | 97% |
| Example 2 | 98 | 97 | 99 | 98 | 95% | 96% |
| Example 3 | 97 | 90 | 95 | 89 | 96% | 95% |
| Example 4 | 102 | 105 | 100 | 100 | 96% | 97% |
| Comparative Example 1 | 50 | 10 | 40 | 5 | 70% | 73% |
| Comparative Example 2 | 44 | 8 | 35 | 1 | 63% | 71% |
| Comparative Example 3 | 40 | 6 | 35 | 4 | 55% | 71% |
| Comparative Example 4 | 60 | 12 | 58 | 10 | 66% | 75% |
| Comparative Example 5 | 110 | 120 | 110 | 115 | 15% | 50% |

TABLE 2-continued

| | Adhesion Test 1 | | Adhesion Test 2 | | Battery Load | |
| --- | --- | --- | --- | --- | --- | --- |
| | Positive-Electrode Side | Negative-Electrode Side | Positive-Electrode Side | Negative-Electrode Side | Characteristic Test | Battery Cycle Test |
| Comparative Example 6 | 61 | 15 | 60 | 12 | 65% | 73% |

TABLE 3

| | Adhesion Test | | |
| --- | --- | --- | --- |
| | Positive-Electrode Side | Negative-Electrode Side | Battery Load Characteristic Test |
| Example 1 | 100 | 100 | 96% |
| Example 5 | 90 | 86 | 99% |
| Example 6 | 96 | 95 | 98% |
| Example 7 | 108 | 115 | 95% |
| Example 8 | 110 | 120 | 87% |

TABLE 4

| | Battery Cycle Test |
| --- | --- |
| Example 1 | 97% |
| Example 9 | 97% |
| Example 10 | 93% |

TABLE 5

| | Adhesion | | |
| --- | --- | --- | --- |
| | Electrolyte A | Electrolyte B | Electrolyte C |
| Example 1 | Good | Good | Good |
| Comparative Example 1 | Poor | Fair | Good |
| Comparative Example 2 | Poor | Poor | Good |
| Comparative Example 3 | Poor | Poor | Good |
| Comparative Example 4 | Poor | Fair | Good |
| Comparative Example 5 | Good | Good | Good |
| Comparative Example 6 | Poor | Fair | Good |

INDUSTRIAL APPLICABILITY

The nonaqueous secondary battery separator of the invention is suitable for use in a nonaqueous secondary battery. The separator is particularly suitable for use in a nonaqueous secondary battery having an aluminum laminate outer casing, where joining to electrodes is important.

The invention claimed is:

1. A separator for a nonaqueous secondary battery, comprising a porous substrate and an adhesive porous layer that is formed on at least one side of the porous substrate and contains a polyvinylidene-fluoride-based resin, the separator for a nonaqueous secondary battery being characterized in that the adhesive porous layer has a crystallinity of 20 to 35%,
the polyvinylidene-fluoride-based resin having a weight average molecular weight of 410,000 to 3,000,000,
characterized in that the value obtained by subtracting the Gurley value of the porous substrate from the Gurley value of the separator for a nonaqueous secondary battery with the adhesive porous layer formed thereon is 0 sec/100 cc to 300 sec/100 cc.

2. The separator for a nonaqueous secondary battery according to claim 1, characterized in that the weight of the adhesive porous layer formed on one side of the porous substrate is 0.5 to 1.5 g/m$^2$.

3. The separator for a nonaqueous secondary battery according to claim 2, characterized in that the adhesive porous layer is formed on both front and back sides of the porous substrate.

4. The separator for a nonaqueous secondary battery according to claim 1, characterized in that the adhesive porous layer is formed on both front and back sides of the porous substrate.

5. The separator for a nonaqueous secondary battery according to claim 4, characterized in that
the total weight of the adhesive porous layers formed on both sides of the porous substrate is 1.0 g/m$^2$ or more and 3.0 g/m$^2$ or less, and
the difference between the weight of the adhesive porous layer on one side and the weight of the adhesive porous layer on the other side is 0% to 20% of the total weight on both sides.

6. The separator for a nonaqueous secondary battery according to claim 1, characterized in that the porous substrate is a polyolefin microporous membrane containing polyethylene.

7. The separator for a nonaqueous secondary battery according to claim 1, characterized in that the porous substrate is a polyolefin microporous membrane containing polyethylene and polypropylene.

8. The separator for a nonaqueous secondary battery according to claim 7, characterized in that the polyolefin microporous membrane includes at least two layers with one of the two layers containing polyethylene and the other layer containing polypropylene.

9. A nonaqueous secondary battery comprising the separator according to claim 1.

* * * * *